2,829,064
PROCESS OF PREPARING TUNG OIL VARNISH RESINS

Lucien L. Hopper, Jr., New Orleans, La., assignor to the United States of America as represented by the Secretary of Agriculture No Drawing. Application October 4, 1955
Serial No. 538,538

1 Claim. (Cl. 106—222)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United Staes of America.

This invention relates to process of preparing tung oil-containing varnishes or lacquers. More particularly, it provides tung oil varnish resins which have unusually rapid oxidative air drying properties for a tung oil formulation which is free from the pronounced tendency to gel or "monkey" during the gas-proofing. Through the specification and claim the term "tung oil varnish resin" is used to refer to a varnish solvent-soluble, homogeneous material produced by heating a mixture of a drying oil which contains at least 50% by weight tung oil and a normally solid varnish resin.

Tung oil is generally considered to be one of the best if not the very best oil for use in oleoresinous and alkyd varnishes, to which it imparts fast drying, good water resistance, and toughness. However, the incorporation of tung oil in such varnishes is difficult from the standpoint of processing by reason of the tendency of varnishes containing a large proportion of tung oil to form an insoluble and infusible gel in the varnish kettle. The tung oil varnish resins should be cooked to a temperature at least above 550° F., both to aid in the attainment of a suitable viscosity and to gas-proof the varnish resin. The gas-proofing is a phenomenon which probably involves the disruption of part of the double bonds in a polyunsaturated drying oil such as tung oil. When the varnish resins are gas-proofed, the surface coatings which they ultimately form are resistant to corrosive atmospheres such as steam, sulfur dioxide fumes and the like. Controlling the temperature of the heating of a tung oil varnish resin is complicated by the fact that at about 550° F. an exothermic reaction occurs, probably due to a partial polymerization of the tung oil, and this reaction tends to cause the mass to heat itself or "coast" to a higher temperature.

Throughout the development of the art, the cooking of varnishes has been an art requiring considerable skill and know-how on the part of the operator. And, the cooking of tung oil varnish resins has proven to be especially difficult. For example, in the production of a typical linseed oil varnish resin the following procedure would be employed. 100 parts of a resin, such as a pentaerythritol ester of maleic modified rosin, and 240 parts (30 gallons) alkali refined linseed oil (varnish makers grade linseed oil) are heated together to 585° F. and held at this temperature for body (about 2 hours). The mass is then allowed to cool to 350° F. and thinned with mineral spirits to bring to 50% solids. The product will then have a satisfactory viscosity of C to E on the Gardner-Holdt scale. Drier such as 6% cobalt naphthenate solution in an amount to provide 0.03% cobalt based on the oil is then added. The product will then dry to touch in about 8 hours.

However, if an attempt is made to replace the linseed oil with tung oil, an exothermic reaction will set in at a temperature of about 535–540° F. causing the temperature to rise spontaneously to well above 585° F. and probably above the fire point of the mass so that there is great danger of its bursting into flame. If, however, by exercising great care and cooling strenuously the temperature is maintained at 585° F. the product will gel in the kettle in from 5 to 10 minutes.

Prior workers have discovered that if the normally solid resin which is cooked with a drying oil consists of a zinc rosinate (commonly referred to in the varnish trade as "zinc resinate"), tung oil varnish resins can be prepared without a serious danger of gelling occurring in the kettle. However, these zinc rosinate tung oil varnish resins are characterized by long drying times, a medium oil varnish often requiring as much as 17 hours or more to dry.

A primary object of the present invention is to provide tung oil varnish resins having the freedom from a danger of a gelation in the cooking kettle which is characteristic of the zinc rosinate tung oil varnish resins, but, having a materially shorter drying time.

We have discovered that such varnish resins are produced when the normally solid resin with which tung oil is cooked is a mixture of zinc rosinate and from about 1 to 5 parts by weight of a resinous rosin-polyhydric alcohol reaction product.

In general, in accordance with the present invention non-gelling, tung oil varnish resins are produced by heating, for the times and temperatures usually employed in the heating and gas-proofing of varnish resins, a mixture of a drying oil which contains at least 50% by weight of tung oil and a resin consisting essentially of a mixture of zinc rosinate and from about 1 to 5 parts by weight of a varnish solvent-soluble, resinous rosin-polyhydric alcohol reaction product, using, for a short-oil resin, a ratio of from about 1 to 1.25 parts of drying oil per part of resin, for a medium-oil resin, a weight ratio of from about 1.5 to 2.5 parts of drying oil per part of resin, and for a long-oil resin from about 3 to 5 parts of drying oil per part of resin. The resulting resin has an improved oxidative air drying rate.

In the heating operation, both the procedures and apparatus usually used in the varnish making art can be used. In controlling the temperature, it is generally preferable to heat rather rapidly to about 550° F. and to allow the temperature to coast to the desired maximum temperature. Where desirable all of the drying oil to be used can be mixed with the resin prior to the start of the heating operation, or portions of the drying oil can be added during or subsequent to the heating operation, to aid in the control of the heating temperature, or to speed the cooling of the mass by the incorporation of a relatively cool material. The heating is preferably conducted so that the resulting varnish resin has a suitable Gardner-Holdt viscosity; of from about C to Z–9 after dilution to 50% solids. The viscosity may be, for example, E to F if it is to be used as a finishing varnish (e. g. for desks) or Z–6 to Z–9 if it is to be used as a floor sealer. The tung oil varnish resins provided by this invention are particularly adapted for use as "varnish concentrates" in which about one part by weight of the varnish resin is mixed with about one part by weight of a varnish solvent to provide a mixture containing from about 40 to 60 (and preferably 50) percent solids and having a viscosity of about Z–6 on a Gardner-Holdt scale and with a varnish drier (such as the usual lead or cobalt varnish driers) in an amount to provide about 0.03 to 0.05% cobalt and about 0.3 to 0.5% lead based on the weight of oil present. They are also particularly adapted for use as floor sealers, in which about one part of the concentrate and drier is mixed with about 80 to 120% of its weight of a varnish solvent to provide a mixture containing about 28% solids.

The zinc rosinate used can be any of the resinous reaction products of zinc and the rosin acids which are usually used in the production of varnishes. Illustrative examples of suitable zinc rosinates include the aldehyde modified zinc rosinates described in U. S. Patent No. 2,572,071, the reaction products of zinc (in the form of zinc oxide) and polymerized rosin, stabilized rosin, disproportionated rosin, and the like, and the zinc rosinates available commercially, such as those containing about 8.75% zinc.

The resinous rosin-polyhydric alcohol reaction product can be any substantially homogeneous varnish solvent-soluble reaction product of the rosin acids with a polyhydric alcohol. Illustrative examples of suitable rosin-polyhydric alcohol reaction products include the reaction products of rosin and glycerol, of rosin and pentaerythritol, and of rosin, pentaerythritol, and maleic anhydride. The drying oil can consist of any of the tung oils or "China Wood Oils" usually employed in the manufacture of varnishes or can consist of a mixture of tung oil with up to about 50% of its weight of any of the drying or semi-drying oils usually used in the production of varnish resins. Illustrative examples of oils which can be mixed with tung oil include linseed oil, soybean oil, safflower oil, dehydrated castor oil, and the like oils.

In the production of "varnish concentrates" the tung oil varnish resins can be mixed with any of the solvents and driers usually used in the manufacture of varnish. Illustrative examples of suitable solvents include turpentine, mineral spirits, varnish makers and painters' naphtha, toluene, xylene, and the like. Illustrative examples of suitable driers include cobalt naphthenate, cobalt linoleate, lead tallate, manganese resinate, and the like.

The following examples are illustrative of the details of at least one method of practicing the present invention.

*Example 1*

5 parts of tung oil and 1 part of zinc rosinate containing 8.75% zinc were mixed and heated to a temperature of 540° F. in about ½ hour. The heat was then turned off and the temperature maintained at about 560° F. for 15 minutes. The product was then allowed to cool and thinned to 50% solids with mineral spirits. This product had a C viscosity on the Gardner-Holdt scale. When used with a lead-cobalt drier (0.5% lead and 0.05% cobalt) it dried to touch in 4½ to 5 hours.

*Example 2*

5 parts of tung oil and 1 part of a mixture of 10 parts of zinc rosinate to 25 parts of a reaction product of rosin, maleic anhydride and pentaerythritol was heated in the manner described in Example 1, but was held at a temperature of 400° F. The mass gelled after about ½ hour at 460° F. When another batch of this material was quickly heated to 580° F. (within about 30 minutes) then quickly cooled to 450° F. in about 10 minutes a satisfactory product was obtained. When thinned to the same viscosity as the product of Example 1 and mixed with a lead-cobalt drier this dried to touch in about 2 hours.

*Example 3*

2 parts tung oil (70 grams) and 1 part zinc rosinate (35 grams) were mixed and heated to 560° F. in about ½ hour. The product was allowed to cool and thinned with 3 parts of mineral spirits, i. e., to 50% solids. The product had a viscosity of F on the Gardner-Holdt scale. When mixed with lead-cobalt drier it dried to touch in 17 hours.

*Example 4*

2 parts tung oil (70 pounds) and 1 part (35 pounds) of a mixture of 25 pounds of a reaction product of rosin, maleic anhydride, and pentaerythritol and 10 pounds zinc rosinate containing 8.75% zinc were heated to a temperature of 555° F. in the course of 1¼ hours. The heat was then cut off and the temperature coasted to a peak of 580° F. The product was allowed to cool without external cooling until the temperature had reached 350° F. (about 1 hour). It was then thinned to 50% solids with mineral spirits. The viscosity was Z-6 on the Gardner-Holdt scale. When mixed with lead-cobalt drier the varnish resins dried to touch in 5 hours.

*Example 5*

When 2 parts tung oil and 1 part of a mixture consisting of 5 parts zinc rosinate and 30 parts of a reaction product of rosin, maleic anhydride, and pentaerythritol were heated as in Example 4 the product gelled. However, when the mixture used consisted of 6 parts zinc rosinate and 29 parts of the reaction product of rosin, maleic anhydride, and pentaerythritol and 1 part of this mixture and 2 parts of tung oil were carefully heated to 560° F. and quickly cooled a satisfactory product was obtained without gelling. When thinned with mineral spirits to 50% solids it had a viscosity of U-V on the Gardner-Holdt scale and when mixed with lead-cobalt drier it dried to touch in about 6 hours.

*Example 6*

When 2 parts of tung oil and 1 part of a mixture of 6 parts of zinc rosinate and 29 parts of an ester of rosin and pentaerythritol were heated to 585° F. and then cooled a satisfactory product was obtained without gelling. When thinned to 50% solids it had a viscosity of R-S on the Gardner-Holdt scale and dried to touch in about 8 hours.

I claim:

A process of preparing a gas-proof, non-gelling tung oil varnish resin having a rapid oxidative air drying rate comprising heat bodying a mixture containing a drying oil having at least about 50% by weight of tung oil and a zinc rosinate having incorporated therein about from 1 to 5 parts by weight of a varnish solvent soluble resinous rosin-polyhydric alcohol reaction product selected from the group consisting of the reaction products of rosin and glycerol, the reaction product of rosin and pentaerythritol, and the reaction products of rosin, pentaerythritol, and maleic anhydride, at a temperature of at least about 550° F.

References Cited in the file of this patent

UNITED STATES PATENTS

| 1,634,359 | Hocker | July 5, 1927 |
| 2,275,583 | Catlow et al. | Mar. 10, 1942 |
| 2,324,432 | Shantz | July 13, 1943 |
| 2,368,126 | Fain | Jan. 30, 1945 |
| 2,406,878 | Whysmuzis et al. | Sept. 3, 1946 |
| 2,464,202 | Rust | Mar. 15, 1949 |

OTHER REFERENCES

Hercules Powder Co., Wilmington, Delaware, "Pentalm A & G Varnishes" (1942), pp. 1–15.

Hercules Powder Co., Wilmington, Delaware, "Pentalyn Resins" (1945).